US012689509B2

(12) United States Patent
    Golden

(10) Patent No.: US 12,689,509 B2
(45) Date of Patent: Jul. 21, 2026

(54) INDUSTRIAL AUTOMATION SYSTEM WITH CERTIFICATE BASED CRYPTOGRAPHIC FEATURE LICENSING

(71) Applicant: ROCKWELL AUTOMATION TECHNOLOGIES, INC., Mayfield Heights, OH (US)

(72) Inventor: Diane E. Golden, West Allis, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 58 days.

(21) Appl. No.: 18/968,762

(22) Filed: Dec. 4, 2024

(65) Prior Publication Data

US 2026/0155971 A1     Jun. 4, 2026

(51) Int. Cl.
H04L 29/06      (2006.01)
G06F 21/10      (2013.01)
H04L 9/14       (2006.01)

(52) U.S. Cl.
CPC .............. H04L 9/14 (2013.01); G06F 21/107 (2023.08)

(58) Field of Classification Search
CPC . H04L 9/14; H04L 63/10; H04L 63/20; H04L 63/0263; H04L 63/108; G06F 21/107
See application file for complete search history.

(56) References Cited

U.S. PATENT DOCUMENTS 7,845,011 B2 * 11/2010 Hirai ..................... G06F 21/606
                                                    726/28
11,477,012 B2 * 10/2022 Visoky .................. H04L 9/3247

FOREIGN PATENT DOCUMENTS

EP          2919414 A1 * 9/2015 ............. H04L 9/321
WO      WO-2023/174943 A1    9/2023

OTHER PUBLICATIONS

Stack Exchange, Are revoked certificates removed from CRLs after expiration? Why is this secure?, URL: https://security.stackexchange.com/questions/172916/are-revoked-certificates-removed-from-crls-after-expiration-why-is-this-secure [site visited Oct. 16, 2024].
Trusted Computing Group, "TPM 2.O Keys for Device Identity and Attestation" Specification, V. 1.00, Rev. 2, Oct. 8, 2021, pp. 1-70, URL: https://trustedcomputinggroup.org/wp-content/uploads/TPM-2p0-Keys-for-Device-Identity-and-Attestation_v1_r12_pub10082021.pdf [site visited Oct. 16, 2024].

* cited by examiner

*Primary Examiner* — Longbit Chai
(74) *Attorney, Agent, or Firm* — Foley & Lardner LLP

(57)                ABSTRACT

A system can include one or more memory devices storing instructions executed by one or more processors. The one or more processors can receive a public key of a device of an industrial automation system corresponding to a private key of the device. The one or more processors can receive a request to grant the device a license to enable a feature of the device or access a feature of the industrial automation system. The one or more processors can generate a certificate including the public key of the device and an indication of the license in a non-encrypted format. The one or more processors can transmit the certificate to the device to cause the device to enable the feature of the device or access the feature of the industrial automation system responsive to the device proving possession of the private key corresponding to the public key in the certificate.

20 Claims, 6 Drawing Sheets

INDUSTRIAL AUTOMATION SYSTEM WITH CERTIFICATE BASED CRYPTOGRAPHIC FEATURE LICENSING

BACKGROUND

Industrial automation systems include a variety of controllable machines (e.g., drives, pumps, motors, robots, etc.) which are used in industrial processes. These machines typically have various moving parts and other components that are driven by instructions received from industrial controller systems. Machine builders, solution providers, and other content creators typically produce the control logic needed to run on these controllers to control the machines. In addition to control logic, machines and controllers (collectively "industrial devices") may operate using firmware, software, control profiles, or other types of features which enable the industrial devices to perform various functions. Such features can be included in the industrial devices at the time of manufacture or later added to the industrial devices via updates (e.g., software updates, firmware updates, etc.).

Users of industrial automation systems can add or activate features of industrial devices via licenses. Such licenses can provide the industrial devices with permanent or temporary access to run software, download updates, perform various functions or operations, access resources on a computing system, or otherwise provide the industrial devices with various permissions, functionality, or other features. One approach for providing licenses to industrial devices is described in U.S. Pat. No. 11,477,012 granted on Oct. 18, 2022 ("the '012 Patent"), the entire disclosure of which is incorporated by reference herein. The system in the '012 Patent generates a device information package which includes a license for an industrial controller. The device information package is encrypted and then signed by a certificate authority and transmitted to the industrial device in encrypted form. The industrial device then decrypts the device information package using a private key to access the license contained therein. The systems and methods of the present disclosure improve upon the licensing systems and methods described in the '012 Patent.

SUMMARY

At least one aspect of the present disclosure is directed to a system for licensing features to industrial devices employed in an industrial automation system. The system can include one or more memory devices storing instructions thereon that, when executed by one or more processors, cause the one or more processors to receive a public key of a device of the industrial automation system, the public key corresponding to a private key possessed by the device. The one or more processors can receive a request to grant the device a license to enable a feature of the device or access a feature of the industrial automation system. The one or more processors can generate a certificate including the public key of the device and an indication of the license in a non-encrypted format. The one or more processors can transmit the certificate to the device to cause the device to enable the feature of the device or access the feature of the industrial automation system responsive to the device proving possession of the private key corresponding to the public key in the certificate.

The one or more processors can generate a signature for the certificate by signing the certificate using a private key of the certificate authority corresponding to a public key of the certificate authority stored in a root certificate of the certificate authority. The system can further include the device. The device can include one or more processing circuits to validate the signature of the certificate using the public key of the certificate authority stored in the root certificate of the certificate authority.

The one or more processors can generate certificates including the public key, indications of different features of the device or access to different features of the industrial automation system, and different expiration times. The one or more processors can transmit the certificates to the device to cause the device to enable the different features of the device or access the different features of the industrial automation system responsive to the device proving possession of the private key corresponding to the public key in the certificates.

The one or more processors can transmit a request to the device for a vendor certificate installed on the device during device manufacturing, the vendor certificate including the public key. The one or more processors can receive the vendor certificate from the device responsive to the request. The one or more processors can extract the public key of the device from the vendor certificate.

The device can be manufactured by a first manufacturer different than a second manufacturer of the industrial automation system. The instructions can cause the one or more processors to transmit a prompt to the device to cause a trusted platform module of the device to generate a message applying for a certificate from a certificate authority, the message including the public key of the device. The one or more processors can receive, responsive to the prompt, the message applying for the certificate from the certificate authority. The one or more processors can extract the public key from the message.

The one or more processors can transmit, to the device, a request for an identity of a removable memory device installed at the device, the removable memory device storing the identity. The private key possessed by the device can be stored on the device or the removable memory device. The one or more processors can receive, responsive to the request, the identity from the device. The one or more processors can cause the certificate to be generated using the identity.

The system can include the device. The device can include one or more processing circuits to receive the certificate from the one or more processors. The one or more processing circuits can transmit a request to one or more computing systems of the industrial automation system located remote from the device to execute the feature of the industrial automation system. The one or more processing circuits can receive, from the one or more computing systems, a request to prove possession of the private key corresponding to the public key in the certificate. The one or more processing circuits can return a response to the one or more computing systems proving possession of the private key and causing the one or more computing systems to execute the feature of the industrial automation system.

The one or more processors can receive a length of time for the license to remain valid. The one or more processors can generate the certificate using the length of time to include an expiration time for the license to expire. The system can further include the device. The device can include one or more processing circuits. The one or more processing circuits can read the expiration time from the certificate. The one or more processing circuits can disable the feature of the device or access to the feature of the industrial automation system responsive to a determination that a current time has reached the expiration time.

The one or more processors can receive a length of time for the license to remain valid. The one or more processors can generate the certificate using the length of time to include an expiration time for the license to expire. The system can include one or more computing systems to read the expiration time from the certificate. The one or more computing systems can receive a request from the device to perform the feature of the industrial automation system. The one or more computing systems can decline the request from the device to perform the feature responsive to a determination that a current time has reached or exceeded the expiration time.

The one or more processors can receive a request to cancel access to the feature of the device or the feature of the industrial automation system. The one or more processors can revoke the certificate responsive to reception of the request.

The one or more processors can receive an identifier of the device. The one or more processors can lookup, using the identifier of the device, the public key from a database storing identifiers of devices manufactured by a manufacturer of the industrial automation system and public keys corresponding to private keys stored on the devices. The one or more processors can cause the certificate to be generated using the public key retrieved from the database.

The one or more processors can receive an indication of an event to trigger an end of the license. The one or more processors can cause the certificate to be generated to include the indication of the event. The system can include the device including one or more processing circuits. The one or more processing circuits can monitor operations performed by the one or more processing circuits or one or more computing systems of the industrial automation system remote from the device. The one or more processing circuits can determine, based on the indication of the event of the certificate and the operations, that the event is triggered. The one or more processing circuits can revoke the certificate responsive to the determination that the event is triggered.

The event can be a predefined number of components being manufactured by the industrial automation system.

The event can be a predefined number of optimizations run by the one or more computing systems to optimize operation of the industrial automation system.

Another aspect of the present disclosure is directed to a method of licensing features to industrial devices employed in an industrial automation system. The method can include receiving, by one or more processing circuits, a public key of a device of the industrial automation system, the public key corresponding to a private key possessed by the device. The method can include receiving, by the one or more processing circuits, a request to grant the device a license to enable a feature of the device or access a feature of the industrial automation system. The method can include generating, by the one or more processing circuits, a certificate including the public key of the device and an indication of the license in a non-encrypted format. The method can include transmitting, by the one or more processing circuits, the certificate to the device to cause the device to enable the feature of the device or access the feature of the industrial automation system responsive to the device proving possession of the private key corresponding to the public key in the certificate.

The method can include receiving, by the one or more processing circuits, an identifier of the device. The method can include retrieving, by the one or more processing circuits, using the identifier of the device, the public key from a database storing identifiers of devices manufactured by a manufacturer of the industrial automation system and public keys corresponding to private keys stored on the devices. The method can include causing, by the one or more processing circuits, the certificate to be generated using the public key looked up from the database.

The method can include receiving, by the one or more processing circuits, an indication of an event to trigger an end of the license. The method can include generating, by the one or more processing circuits, the certificate to include the indication of the event. The method can include monitoring, by the device, operations performed by the one or more processing circuits or one or more computing systems of the industrial automation system remote from the device. The method can include determining, by the device, based on the indication of the event of the certificate and the operations, that the event is triggered. The method can include requesting, by the device, that a certificate authority revoke the certificate responsive to the determination that the event is triggered. The method can include requesting, by the device, a list of revoked certificates from the certificate authority (or an authorized intermediary), and determining, by the device, that the certificate is revoked based on the list.

The method can include receiving, by the device, the certificate from the one or more processing circuits. The method can include transmitting, by the device, a request to one or more computing systems of the industrial automation system located remote from the device to execute the feature of the industrial automation system. The method can include receiving, by the device, from the one or more computing systems, a request to prove possession of the private key corresponding to the public key in the certificate. The method can include returning, by the device, a response to the one or more computing systems proving possession of the private key and causing the one or more computing systems to execute the feature of the industrial automation system.

At least one aspect of the present disclosure is directed to an industrial device of an industrial automation system. The industrial device can include one or more processing circuits to transmit a public key of the industrial device to one or more computing systems, the public key corresponding to a private key possessed by the industrial device. The one or more processing circuits can, responsive to transmitting the public key to the one or more computing systems, receive, from the one or more computing systems, a certificate including the public key of the industrial device and an indication of a license in a non-encrypted format, the license to enable a feature of the industrial device or access a feature of the industrial automation system. The one or more processing circuits can prove possession of the private key corresponding to the public key in the certificate. The one or more processing circuits can perform the feature or access the feature of the industrial automation system responsive to proving possession of the private key.

The one or more processing circuits can transmit a request to one or more external computing systems of the industrial automation system located remote from the industrial device to execute the feature of the industrial automation system. The one or more processing circuits can receive, from the one or more external computing systems, a request to prove possession of the private key corresponding to the public key in the certificate. The one or more processing circuits can return a response to the one or more external computing systems proving possession of the private key and causing the one or more external computing systems to execute the feature of the industrial automation system.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing.

DETAILED DESCRIPTION

Figure 1:
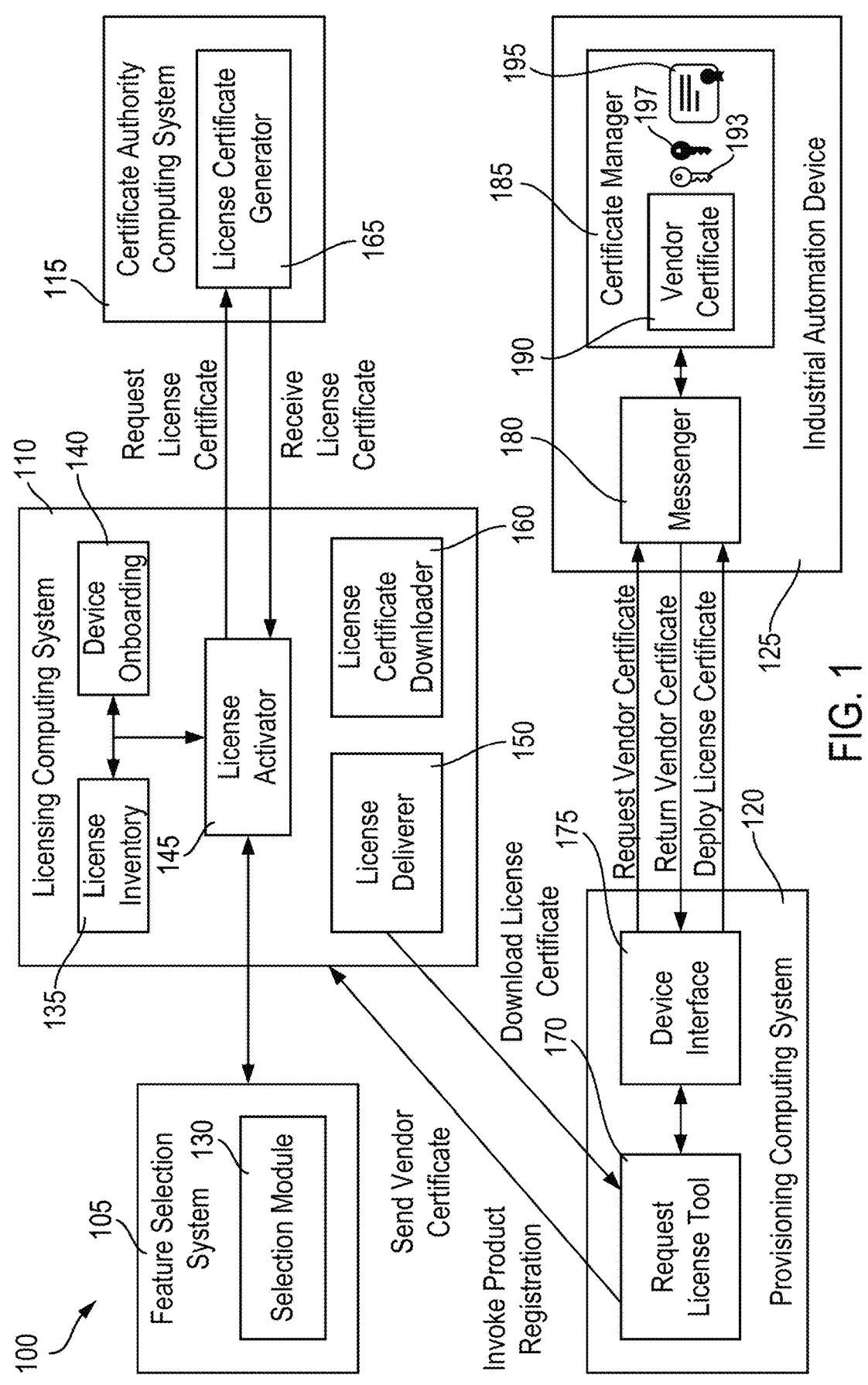
FIG. 1 depicts a system to generate a license certificate bound to a device of an industrial automation system based on a vendor certificate retrieved from the device, according to an exemplary embodiment.

Following below are more detailed descriptions of various concepts related to, and implementations of, methods, apparatuses, and systems for certificate based cryptographic feature licensing for industrial automation systems. The various concepts introduced above and discussed in greater detail below may be implemented in any of numerous ways.

This disclosure is generally directed to certificate based cryptographic feature licensing for industrial automation systems. A licensing system can generate at least one software license or software feature license for an industrial automation system (e.g., an assembly line system, a robotic manufacturing system, an additive manufacturing system, etc.). The license can be a subscription license providing the device a subscription to execute a piece of software or enable a particular feature of the piece of software. However, for many subscription systems, the device may need constant network connectivity to a licensing server to perform a license check with the licensing server. These techniques may not work for many industrial licensing applications, particularly situations requiring offline product activation or license deployment, which can be frequently needed in industrial automation systems. Furthermore, in many conventional licensing systems, in order to give the device a license, claim ownership of the device, or transfer a license from one device to another, a user may need to contact a customer support system for manual intervention.

To solve these and other technical problems, technical solutions of this disclosure can include certificate based cryptographic feature licensing for industrial automation systems. More particularly, the technical solutions of this disclosure can include generating a certificate that indicates one or more licensed features and is bound to a physical device of the industrial automation system, such as a controller or machine. The licensing certificate can be tied to a hardware root of trust, which can be part of the physical device or accessible by the physical device. The physical device can include a cryptographic root of trust that is stored on the device when the device is manufactured, e.g., the physical device can store a unique private key generated at manufacturing time. A computing system can generate the license certificate to include a public key of the physical device tied to the private key. The physical device can prove ownership of the unique private key tied to the public key included in the certificate, which entitles the physical device to make use of the licensed features specified by the certificate.

The license certificate can be deployed to the physical device, which can validate or prove the authenticity of the certificate, thereby removing the need for network connection to a licensing server to perform license checks. The certificate license can enable or add new software or system capabilities to a device without a device needing a firmware update or manual intervention. Utilizing a public key infrastructure (PKI) for feature licensing enables subscription models, license revocation, and license transfer between devices with full audit traceability. Because the certificate is generated to include the public key tied to the private key stored on the device, the certificate can be verified based on the device proving possession of the private key. The system can verify the authenticity of the certificate using the public key of the certificate authority, but also request the device prove possession of the private key to verify that the device is licensed the software feature. Therefore, the license certificate can enable offline license binding and activation mechanisms to support both network connected and unconnected industrial automation systems. Furthermore, the system can also query the certificate authority or an authorized representative (which could have a cached off-line copy) for a Certificate Revocation List (CRL) identifying revoked certificates to ensure the certificate has not been revoked.

Furthermore, unlike other techniques which may require a device information package to be encrypted and only readable by the recipient device, the present solution can include issuing feature licenses as certificates in the clear or in an unencrypted format. The license certificates can be transmitted along an insecure channel without needing encryption. Because the certificate is unencrypted, any system or device in possession of the certificate can read the certificate to determine what features have been licensed to the device or the industrial automation system. Furthermore, the license certificate can include an expiration date or time in the clear to trigger the device, another system, or the certificate authority to stop granting the device access to the feature or revoke the feature license. For example, if the device provides a user access to a feature of the device based on the license certificate, the device can disable the feature responsive to reading the expiration time from the certificate and detecting that the expiration date has passed. Furthermore, if another system of the industrial automation system gives the device access to a feature based on the license certificate, the system can stop giving the device access to the feature responsive to reading the expiration date from the license certificate and detecting that the expiration date has passed.

Similarly, the certificate can include, in an unencrypted format, an indication of an event and an indication of an attribute to monitor to determine if the event is triggered. The event can define a condition for the license to end. For example, a system or the device can monitor a number of products manufactured by the industrial automation system, a number of optimizations performed by a computing system of the industrial automation system, etc. and cause the license to end or be revoked upon detecting that a predefined number of products have been manufactured or a predefined number of optimizations have been performed.

To generate the license certificate, a computing system can query an existing manufacturing PKI to retrieve a device identity, e.g., a public key, for a device. Alternatively, the computing system can query the device and request a copy of the vendor certificate including the public key stored on the device. For a COTS devices, the computing system can interact with a TPM to request a CSR including the public key of the device. With this identity information, the computing system can cause a certificate authority to generate a feature license bound to the device's identity. If the license certificate includes an expiration, the computing system can include a mechanism to automatically renew a feature license and deploy an updated license certificate to a device prior to the expiration of the current license. When a license certificate expires, the certificate may fail a validity check assuming a consistent sense of system time. CRLs can include certificates that have either been irreversibly revoked (revoked) or have been marked as temporarily invalid (hold), expired certificates can be purged from a CRL. In some embodiments, the computing system can cause the licensing certificate authority to revoke a license from one device to enable that license to be transferred or re-hosted on a different device. A device may utilize a pull license mechanism where the device reaches out to a server to retrieve any feature license if the license is available. A device can use a pull license mechanism (and short duration expiring licenses) to request a license from a pool of available licenses. This can help in environments where a customer buys a fixed license subscription amount but needs to be able to quickly swap out physical hardware devices while maintaining the system's licensed features. For example, the hardware can be disposable, and the licenses easily transferable up to a predefined available capacity pool limit.

By allowing the licenses to be viewable by parties other than the licensed device, additional capabilities can be unlocked in application software layers and the fully licensed capabilities of devices can be reflected in a system inventory and topology. This can enable secure licensing of software interactions with devices. For example, licensing an analytics capability for numerous devices allows a user to generate numerous licenses bound to devices, and the analytics capability will only interact with devices containing the appropriate feature license. Furthermore, the present techniques can enable automated device replacement use cases (e.g., via a license pool) without the need for a licensing grace period.

Referring now to FIG. 1, among others, an example system 100 to generate a license certificate 195 bound to an industrial automation system device 125 of an industrial automation system based on a vendor certificate 190 retrieved from the device 125 is shown. The device 125 can be a component of an industrial automation system, such as a controller to control an automation system (e.g., to control manufacturing equipment, robotic equipment, conveyor system, etc.). The device 125 can be a robotic system, a conveyor system, a programmable logic controller (PLC), an industrial power control system, a sensor system, a supervisory control and data acquisition (SCADA) system, a human machine interface (HMI), a supervisory controller, etc.

The device 125 can be or include at least one computing or processing system to execute pieces of software, software instructions, or software modules. The device 125 can include at least one certificate manager 185. The certificate manager 185 can be at least one software or hardware component. The certificate manager 185 can store or include at least one vendor certificate 190. The vendor certificate 190 can be a certificate signed by a certificate authority of a vendor or manufacturer of the device 125. The vendor certificate 190 can be installed, loaded, placed, or saved onto at least one memory or storage device of the device 125 during manufacturing, programming, or creation of the device 125. For example, the certificate 190 can be an X.509 certificate. The certificate 190 can uniquely identify the device 125. The certificate 190 can include, or be linked to, a public key 193 of the device 125. The public key 193 can be linked, related, or associated with a private key 197. The public key 193 and the private key 197 can be a key pair for a PKI. The private key 197 can be stored on or within the device 125, e.g., by the root of trust. A certificate manager can manage certificate storage on the device 125 (e.g., the non-secret certificates that can be provided upon request to others in the system).

The public key 193 and the private key 197 can be keys of a Rivest-Shamir-Adleman (RSA) public-key system. Public key 193 and the private key 197 can have a variety of sizes, e.g., RSA-2048, RSA-617, RSA-480, or any other size. Furthermore, the public key 193 and the private key 197 can be keys can be elliptic-curve cryptography (ECC) keys, Galois fields based keys, ElGama based keys, or any other type of similar asymmetric key cryptosystem.

The system 100 can include at least one provisioning computing system 120. The provisioning computing system 120 can be or include at least one computing or processing system to execute pieces of software, software instructions, or software modules. The provisioning computing system 120 can include at least one device interface 175 to interface and communicate with the device 125. For example, the interface 175 can send, transmit, or provide a request to the device 125 for the vendor certificate 190. The interface 175 can transmit the request to a messenger 180 of the device 125. The messenger 180 can be any communications system or subsystem. The messenger 180 can be a component of the device 125 to respond to requests from the provisioning computing system 120. The messenger 180 can retrieve the vendor certificate 190 from the certificate manager 185. The messenger 180 can respond to the provisioning computing system 120 with the vendor certificate 190. Responsive to the request, the device interface 175 can receive the vendor certificate 190 from the device 125.

The provisioning computing system 120 can forward, send, transmit, or deliver the vendor certificate 190 to at least one licensing computing system 110 of the system 100. For example, the provisioning computing system 120 can include at least one tool 170 to provision or commission the device 125. For example, the tool 170 can receive input from a user or user device via at least one graphical user interface to cause the tool to commission or provision the industrial automation device 125. For example, if the device 125 is a newly purchased or installed device in a manufacturing or industrial environment, the tool 170 can cause the device 125 to be registered with the licensing computing system 110. For example, the tool 170 can cause the device interface 175 to retrieve, request, or get the vendor certificate 190 from the device 125. The tool 170 can send, forward, transmit, or provide the retrieved vendor certificate 190 and an invocation to register the device 125 to the licensing computing system 110.

The system 100 can include at least one feature selection system 105. The feature selection system 105 can be or include at least one computing or processing system to execute pieces of software, software instructions, or software modules. The feature selection system 105 can communicate with at least one user device or client device (e.g., a smartphone, laptop computer, desktop computer, tablet, etc.) to allow a user to provide input to acquire, purchase, buy, renew, or select a piece of software or a feature of a piece of software to license for the device 125 or an industrial automation system which the device 125 is installed in to operate. For example, the feature selection system 105 can include at least one license selection module 130 to interact with the user device and provide webpages, commerce systems, payment systems, etc. to allow a user to select software licenses or software feature licenses.

For example, the software or software feature can enable the device 125 or the industrial automation system as a whole to manufacture a product (e.g., a predefined number of products), operate for a total runtime, perform a total number of optimizations, and/or various other software or software features that add or activate functionality of the device 125 or the industrial automation system (e.g., a software feature to perform analytics, a software feature to perform predictive maintenance, a software feature for device optimizations, a software feature for disaster recovery, etc.). Responsive to completing a purchase for a license, the feature selection system 105 can forward or transmit an indication of the license that was selected to the licensing computing system 110. In some embodiments, a customer can select a common hardware SKU for a device 125 and cause the device 125 to be dynamically provisioned with the device's licensed software or firmware capabilities on demand. This can simplify spare parts stocking, customers do not need to know the exact capacity or feature requirements of their application prior to ordering the physical hardware. The customer can select a license or upgrade their licensed capacity as their application needs change. In some embodiments, a customer can configure a policy via the feature selection system 105 where a specific hardware SKU is set to be used by the selection module 130 to automatically provision devices of said SKU with a certain set of feature licenses. This can support automatic device replacement use cases.

The system 100 can include at least one licensing computing system 110. For example, the licensing computing system 110 can be or include at least one computing or processing system to execute pieces of software, software instructions, or software modules. The licensing computing system 110 can receive the public key 193 of the device 125. For example, the licensing computing system 110 can receive the vendor certificate 190 including the public key from the provisioning computing system 120. The licensing computing system 110 can read or extract the public key 193 from the vendor certificate 190.

The licensing computing system 110 can receive licenses from the feature selection system 105, and populate a licensing inventory 135 using the received license. The licensing inventory 135 can store a list or record of licenses granted to different devices 125, to different entities (e.g., companies, users, business owners), or for different industrial automation systems. The licensing computing system 110 can further store product registration data. The device onboarding service 140 can store a list or record of registered devices 125 for different entities.

The licensing computing system 110 can include at least one license activator 145. The license activator 145 can receive a request to grant the device 125 a license for a software feature. The request can be an indication received from the feature selection system 105 responsive to a license being selected. For example, the license activator 145 can receive a new license from the feature selection system 105. The request can be an indication to invoke product registration from the provisioning computing system 120. In some embodiments, the license may already exist or have been purchased in the past before the device 125 is registered. Responsive to receiving a product registration invocation from the provisioning computing system 120, the license activator 145 can retrieve at least one license for the device 125 from the license inventory 135. The license activator 145 can further receive the vendor certificate and public key 193 (which can be included within the vendor certificate 190) from the system 120.

The license activator 145 can cause a license certificate 195 to be generated to grant the license to the device 125 or an industrial automation system (e.g., an industrial automation system which the device 125 is installed in). The license activator 145 can cause the license certificate 195 to be generated using the public key 193 of the device 125. For example, the license certificate 195 can be an X.509 certificate. The license certificate 195 can be generated to include the public key 193. By including the public key 193, the license certificate 195 can be tied to the identity of the device 125. The license certificate 195 can include an indication of the license for the software feature.

The license activator 145 can generate (or cause the certificate 195 to be generated) by sending a request for a license certificate 195 to at least one certificate authority (CA) computing system 115. The certificate authority computing system 115 can be the same as or similar to the certificate authority system described in the '012 Patent. The request can include an indication of the license (e.g., a description of the license, an identifier of the license, a signature of the license) and the public key 193. The certificate authority computing system 115 can include at least one license certificate generator 165 that uses the request to generate a certificate 195. For example, the license certificate generator 165 can issue a certificate 195 including the indication of the public key 193, the indication of the license, an expiration time for the license, and/or an event responsive to which the license should end. The license certificate generator 165 can sign the license certificate 195 using a private key of the certificate authority computing system 115. The license certificate generator 165 can generate the license certificate 195 without encrypting the license certificate 195, such that any system or device can read the license certificate 195. However, because the license certificate 195 includes a signature created by the private key of the certificate authority computing system 115, a system can use the public key of the certificate authority computing system 115 to verify the authenticity of the license certificate 195. The public key can be included or stored in a certificate of the certificate authority computing system 115, e.g., in a root certificate for the certificate authority computing system 115. The root certificate can be signed by a trusted root certificate authority. Therefore, the signature of the license certificate 195 can be validated by any system with a copy of the root certificate for the licensing certificate chain. A online certificate authority can issue a certificate chain, which can include at least three certificates, but can include any number of intermediaries. The root certificate can include the PKI's public key, and the root can be stored offline. A first intermediary certificate (which could be used by the certificate authority computing system 115) can include the intermediary certificate authority's public key and can be signed with the private key of the root. The validity of the chain can be verified by checking the signature of the certificate against the public key one level higher in the chain, until the checking gets back to the trusted root certificate. The certificate chain can store a public key of the certificate authority computing system 115. A system can use the public key of the certificate authority to verify the signatures of the license certificates 195 generated by the certificate authority computing system 115 to verify that the certificate authority computing system 115 signed the license certificate 195 using the private key of the certificate authority computing system 115 corresponding to the public key of the certificate authority computing system 115.

The license certificate 195 can provide licensing information to the device 125 about the specific software behaviors or software features that are enabled on the device 125 or in the industrial automation system. The licensing information of the license certificate 195 can be information describing licenses for other software or system services for system level features which may be enabled with the device (e.g., analytics, predictive maintenance, device optimization, disaster recovery, etc.).

The license certificates 195 can be issued with expiration dates to enable software feature subscriptions. The license certificate 195 can include an expiration date or time tied to a time-based license subscription. The license certificates 195 can grant a license to a software feature for a predefined length of time. For example, the feature selection system 105 can receive an indication of a length of time for the license to the software feature to be available. For example, via the license selection module 130, a user may select a software license for a month, for a quarter, for a year, etc. The licensing computing system 110 can receive, from the feature selection system 105, the length of time for the software feature to be available. The feature selection system 105 or the licensing computing system 110 can generate an expiration date or time based on a current date or time and the length of time that the software feature is licensed. The licensing computing system 110 can send the expiration date or time to the certificate authority computing system 115 to use to generate the license certificate 195. The certificate authority computing system 115 can cause the license certificate 195 to be generated to include the expiration date or time. Furthermore, responsive to a current day or time reaching the expiration date or time, the license certificate 195 can automatically become invalidated.

Furthermore, the license certificate 195 can include an indication of an event to trigger an end of a particular software license. The feature selection system 105 can receive an indication of an event when a user selects a software license. For example, when selecting the license via the feature selection system 105, a user can define the scope or duration of a license using the event. The feature selection system 105 can transmit the indication of the event to the licensing computing system 110. The licensing computing system 110 can receive an indication of an event. The licensing computing system 110 can cause the licensing certificate 195 to be generated to include the indication of the event. The licensing computing system 110 can include the indication of the event in the request sent to the certificate authority computing system 115, and the certificate authority computing system 115 can cause the certificate to include an indication of the event. The licensing certificate 195 can include an indication that the software feature license should end responsive the event being met or satisfied.

For example, the event can be the industrial automation device 125 or the industrial automation system producing a predefined number of products or components (e.g., a predefined number of widgets). The event can be a predefined number of software optimizations run by one or more computing systems (e.g., cloud computing systems, server computer systems, local computing systems) to optimize the operation or performance of the industrial automation system. The optimizations can determine control decisions for the industrial automation system, predict system faults in the industrial automation system, reduce energy usage of the industrial automation system, etc.

The device 125 can execute at least one software application to monitor operations performed by the device 125 itself, or by the industrial automation system (e.g., computing systems, controllers, or other devices remote from the device 125). The device 125 (or an additional software monitoring system) can receive sensor data or operating data of the device 125 or the industrial automation system. The data can track or indicate the number of products produced by the industrial automation system. The data can indicate a number of optimizations run for the industrial automation system (e.g., by a remote cloud or computing system). The device 125 can determine, based on the indication of the event and the monitored operations, whether the event is triggered. The device 125 (or the software monitoring system) can generate an alert, flag, or indication responsive to detecting that the event included in the certificate 195 is satisfied based on the received data. The device 125 can request that the certificate authority computing system 115 revoke the certificate responsive to the determination that the event is triggered. The certificate authority computing system 115 can revoke the license certificate 195 responsive to the request. For example, responsive to detecting that the event is satisfied, the device 125 (or the software monitoring system) can transmit a request for the license certificate 195 to be revoked. For example, the device 125 can transmit the request to the certificate authority computing system 115 for the license certificate to be revoked. Furthermore, the device 125 can stop a user or other system from using the feature responsive to determining that the event is triggered. The device 125, or any authorized party, can request a license certificate 195 be revoked. The certificate authority computing system 115 can revoke the license responsive to the request by publishing a CRL. The device 125 or another system can request and receive the CRL from the certificate authority computing system 115, and determine whether any license certificates 195 stored on the device 125 have been revoked or not. The device 125 can disable or delete any license certificate 195 listed on the CRL as being revoked.

The licensing computing system 110 can receive the license certificate 195 generated by the certificate authority computing system 115 responsive to the request to generate the license certificate 195. The licensing computing system 110 can include at least one license certificate downloader 160. The license certificate downloader 160 can collect and download the license certificates generated by the certificate authority computing system 115. The license certificate downloader 160 can store the license certificates offline for the device 125 or another system to access when the certificate authority computing system 115 is offline or unavailable. Because the downloader 160 downloads license certificates 195 offline, there can be manual intervention to download a license, particularly for offline or isolated networks or if network connectivity to the certificate authority computing system 115 is available, and furthermore the license certificate deployment can be automated.

The licensing computing system 110 can include at least one license deliverer 150. The license deliverer 150 can deliver, send, or transmit the license certificate 195 to the device 125. For example, the license deliverer 150 can send the license certificate 195 to the tool 170, which can deploy the license certificate 195 to the device 125 (e.g., to the certificate manager 185). The licensing computing system 110 can transmit the license certificate 195 to the device 125 to cause the device 125 or one or more computing systems of the industrial automation system to execute a software feature licensed by the license certificate 195 responsive to the device 125 proving the license certificate 195 using the private key 197. Responsive to receiving the license certificate 195, the device 125 itself can execute the licensed software feature, or request another computing system perform the licensed software feature (e.g., a cloud platform, a server system, a local controller, a local computing system, etc.). The device 125 can prove the license certificate 195 to the other computing system by generating proof data with the private key 197. The device 125 can send the proof data to the other computing system, responsive to which the computing system can operate the licensed software feature.

For example, certificate authenticity can be independently verified by both the device 125 and additional or supporting software applications or system services. A computing system can generate a challenge for a particular license certificate 195, and send the challenge to the device 125. For example, the computing system can generate a nonce (number used only once), such as a random number (e.g., a pseudo-random number) using a random number generator, and encrypt the nonce using the public key 193 of the device 125 included in the certificate 195. The computing system can transmit, send, or deliver the encrypted nonce to the device 125 as part of the challenge. The device 125 can generate proof data using the private key 197 and the nonce, and respond to the computing system with the proof data to prove that the device 125 stores or is in possession of the private key 197 linked to the public key 193 included in the license certificate 195. For example, the device 125 can decrypt the encrypted nonce using the private key 197, and return the nonce signed by the private key of device 125 (or alternatively return the nonce in the clear). The signature of the nonce can be validated based on the public key 193 in the license certificate 195 and can prevent brute force attacks where a system happens to guess the random number. In this regard, the requesting system can compare the decrypted nonce to the original nonce, and determine that the device 125 stores the private key 197 responsive to the two numbers matching. By using a nonce in this manner, replay attacks can be prevented from succeeding.

In some embodiments, the license certificate 195 may be in the clear, be or include clear text, or be in an unencrypted format. For example, the license certificate 195 may not be encrypted by the certificate authority computing system 115 or another computing system, and can be read by the licensing computing system 110, the provisioning computing system 120, the device 125, or any other component of the industrial automation system. Because the license certificate is generated and authenticated by the certificate authority computing system 115, and is rooted in the identity of the device 125, there may be no integrity concerns with respect to transmitting and storing it in the clear. Furthermore, because the certificate 195 can be transmitted and stored in the clear, multiple devices or computing systems can store or use the certificate 195, e.g., responsive to the device 125 sending a request to another computing system to execute a software feature licensed by the certificate 195.

In some implementations, the device 125 can include multiple different license certificates 195. The device may possess multiple valid feature license certificates 195 at the same time. The device 125 can include different license certificates 195 for different software features that the device 125 or the industrial automation system is licensed to use. The device 125 can include a mix of different license certificate types, e.g., subscription licenses that are temporary and must be renewed, and perpetual licenses that do not need to be renewed. Each of the license certificates 195 can be generated using the same public key 193 of the device 125. However, the license certificates 195 can include indications of different software features or different expiration times. For a "permanent" license, the expiration date can be set to a time beyond the predicted or estimated lifespan of the device 125, e.g., 30 years into the future from the date the license certificate 195 is issued. Certificates may be required to have expiration dates to be valid, and therefore, a "perpetual" license can have an expiration date a significant length of time into the future, e.g., 30 years. Responsive to generating multiple license certificates 195 for the device 125, the licensing computing system 110 can transmit all of the license certificates 195 to the device 125 or to another computing system of the industrial automation system to deploy the licenses. The device 125 can prove each license certificate 195 using the private key 197 before approving use of the license to the software features.

Feature license certificate 195 can be securely bound to hardware, e.g., the device 125, but can unlock and enable software interactions in a larger system, such as the industrial automation system. The devices 125 can freely share their licensed capabilities with the larger system. For example, in some embodiments, the software features that the license certificate 195 is for are performed on computing systems remote from the device 125, e.g., on cloud computing systems, server systems, edge devices, etc. The device 125 can store the certificate 195, and transmit a request to the remote computing systems to perform or execute the software features. The remote computing systems may request that the device 125 prove that the device 125 is the rightful owner of the license certificate 195, responsive to which the device 125 can generate proof data using the private key 197, and transmit the proof to the remote computing system, responsive to which the remote computing system can execute the licensed software features. In some embodiments, a system or device, such as the remote computing systems, can query the licensing PKI, e.g., the certificate authority computing system 115 or the licensing computing system 110, to check the validity or revocation status of a particular license certificate 195. For example, a device 125 may have a license certificate 195 that is revoked. Responsive to detecting that a device has a revoked license, the system can block the device 125 from interacting with the system, or can reduce the functionality of the device 125 (e.g., allow the device 125 to access basic functionality, but not licensed functionality). The remote system can send a request to the licensing computing system 110, certificate authority computing system 115, or the device 125 to ensure that the certificate 195 has not been revoked. For example, the certificate authority computing system 115 can respond with a list of revoked certificates such that the remote system can verify that the certificate 195 is not revoked. Furthermore, the remote system can independently confirm that the certificate 195 was issued by the certificate authority computing system 115, e.g., verify the signature of the certificate 195 created by the certificate authority with the private key of the certificate authority. In some embodiments, the remote system can determine to skip the proof of possession check if the remote system trusts the license certificate authority and can directly query the certificate's validity.

In some embodiments, the license certificates 195 can be provisioned to the device 125 by the manufacturer, machine builder, or original equipment manufacturer (OEM). The provisioned licenses can transfer to the end user along with the device 125. For example, the manufacturer of the device 125 can provide the device 125 with an initial subscription license with an expiration time (e.g., one year, 18 months, etc.) or an event (e.g., number of widgets manufactured), after which, the license certificate 195 may be revoked, and the end user may need to select an ongoing subscription license. In some embodiments, if a manufacturer wants to restrict the execution of their code to a particular device 125, the manufacturer can provision the device 125 with a custom license certificate that enables code execution only for that device.

In some embodiments, the licensing computing system 110 can upgrade a software license. For example, responsive to receiving an indication to upgrade a license, the licensing computing system 110 can have the certificate authority computing system 115 generate a new certificate license upgrading the licensed software features. The licensing computing system 110 can request that license certificate generator 165 revoke the previous license certificate. In some embodiments, the licensing computing system 110 can downgrade a software license. For example, responsive to receiving an indication to downgrade a license (e.g., responsive to a customer request, a customer request to change to a lower subscription tier, an event triggering, or a portion of a compound license becoming no longer valid), the licensing computing system 110 can have the certificate authority computing system 115 generate a new certificate license downgrading the licensed software features. The licensing computing system 110 can request that license certificate generator 165 revoke the previous license certificate. In some embodiments, the feature licenses can be automatically generated or renewed for any device 125 (including a COTS device) that has already been registered with the licensing computing system 110 and/or the certificate authority computing system 115. Furthermore, custom feature licenses can be created by the licensing computing system 110 to enable personalized sets of features for various customers.

The device 125, the provisioning computing system 120, the licensing computing system 110, or the feature selection system 105 can request that the certificate authority computing system 115 revoke at least one certificate 195. In some embodiments, the device 125, the provisioning computing system 120, the licensing computing system 110, or the feature selection system 105 can transmit a request to the certificate authority computing system 115 to request that the certificate authority computing system 115 revoke a particular license certificate 195. In some embodiments, the feature selection system 105 can cause a license certificate 195 be revoked responsive to receiving user input from a user device to transfer the license from one device 125 to another device 125. In some embodiments, the feature selection system 105 can cause a license certificate 195 be revoked responsive to the device 125 being returned after selected or responsive to determining that an order for the device 125 was cancelled. In some embodiments, the device 125 detects that a license has been exhausted (e.g., a predefined number of products have been manufactured by the industrial automation system, a predefined number of optimizations have been run, a predefined number of faults have been predicted, or some other attribute based event driven trigger), the device 125 can request that the certificate authority computing system 115 revoke the corresponding license certificate 195.

In some embodiments, the device 125 can pull or retrieve licenses from the licensing computing system 110. For example, the device 125 can send a prompt or query to the licensing computing system 110 for all license certificates 195 (e.g., all active license certificates 195). The licensing computing system 110 can respond to the prompt, and provide the device 125 with the certificates 195 of the device 125. The device 125 can pull the license certificates 195 via enrollment over a secure transport.

Figure 2:
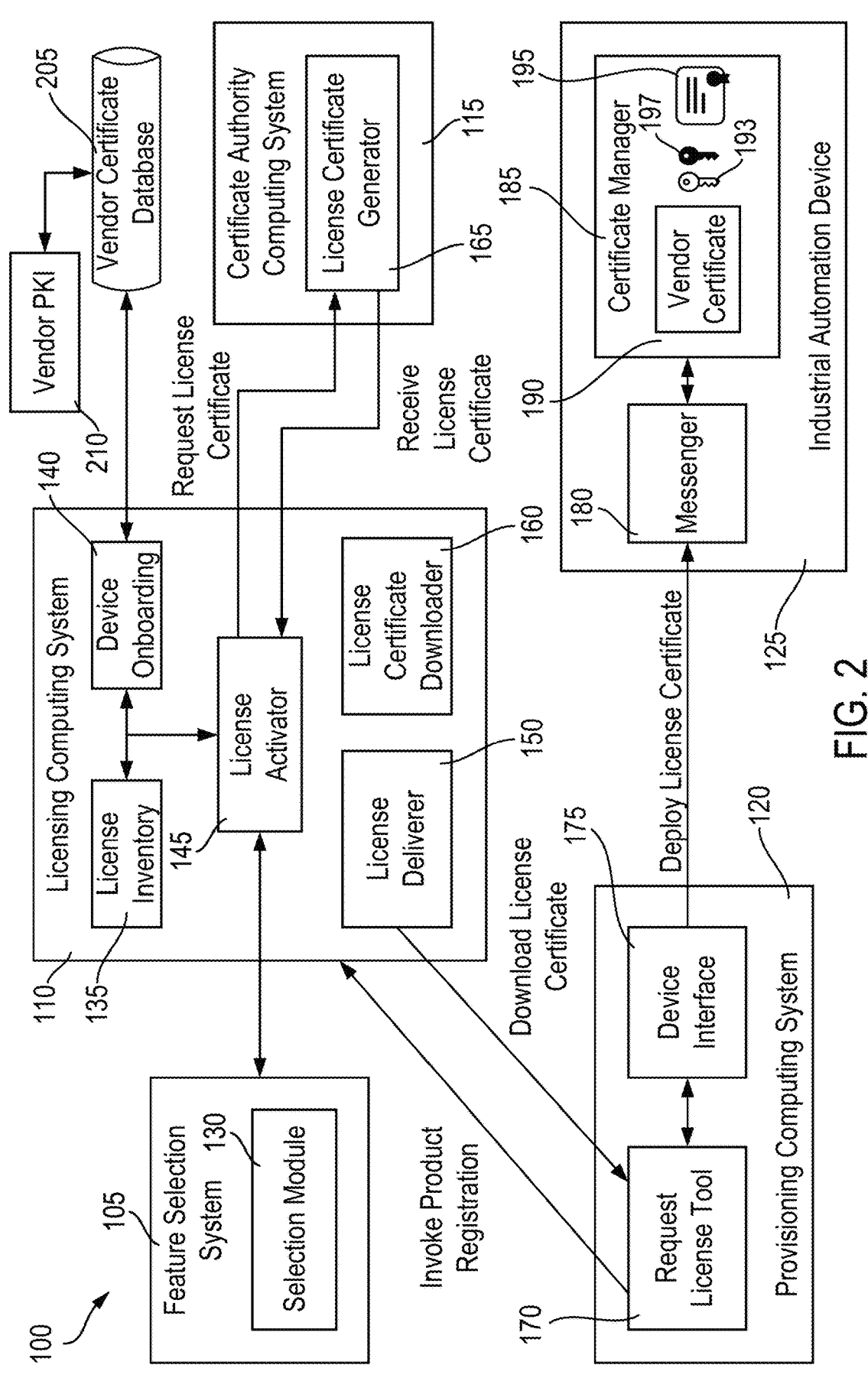
FIG. 2 depicts a system to generate a license certificate bound to a device of an industrial automation system based on a vendor certificate retrieved from a database of vendor certificates produced by a manufacturer, according to an exemplary embodiment.

Referring now to FIG. 2, among others, an example system 100 to generate a license certificate 195 bound to a device 125 of an industrial automation system based on a vendor certificate 190 retrieved from a database 205 of vendor certificates 190 produced by a manufacturer is shown. The system 100 can include at least one vendor certificate database 205. The vendor certificate database 205 can be a key-value database, a relational database, a structured query language (SQL) database, a not-only SQL (noSQL) database, or any other type of data storage system or device that can be queried. The vendor certificate database 205 can store multiple different vendor certificates 190 for various devices 125. Each vendor certificate 190 can store a public key of a particular device 125. The vendor certificate database 205 can store identifiers of the devices 125. The vendor certificate database 205 can store links between the vendor certificates 190 and the corresponding identifiers of the devices 125.

The device onboarding service 140 (which may be a device enrollment service) can communicate with the vendor certificate database 205. For example, the device onboarding service 140 can lookup information or data of the vendor certificate database 205. The device onboarding service 140 can look up a vendor certificate 190 for a particular device 125. For example, the device onboarding service 140 can receive an identifier of the device 125. The identifier can be received from the provisioning computing system 120.

The identifier can be or include a serial number, a unique device identifier (UDI), a stock keeping unit (SKU) in conjunction with a unique identifier, a media access control (MAC) address, or any other unique identifier of the device 125. The device onboarding service 140 can look up and retrieve the vendor certificate 190 of the device 125 from the vendor certificate database 205 using the identifier. The device onboarding service 140 can extract, read, or pull the public key of the device 125 from the retrieved vendor certificate 190. With the extracted public key, the license activator 145 can cause the certificate authority computing system 115 to generate the license certificate 195 to include the extracted public key.

In some embodiments, a manufacturing, manufacturer's, or vendor PKI 210 can generate vendor certificates 190 for each device 125 manufactured by a manufacturer. The manufacturer can be a company or entity associated with, or in control of, the system 100. The vendor PKI 210 can program each device 125 with a vendor certificate 190 and request each device 125 generate a unique public key 193 and a unique private key 197. The device 125 can generate a CSR and send the CSR to the PKI 210 issuing vendor certificates. The CSR can include the public key 193 of the device 193. Each vendor certificate 190 can include the public key 193 of the device. The vendor PKI 210 can cause the database 205 to store the vendor certificate 190 (or just the public key 193 of the device) responsive to the vendor PKI 210 programming a device 125 with the vendor certificate 190.

Figure 3:
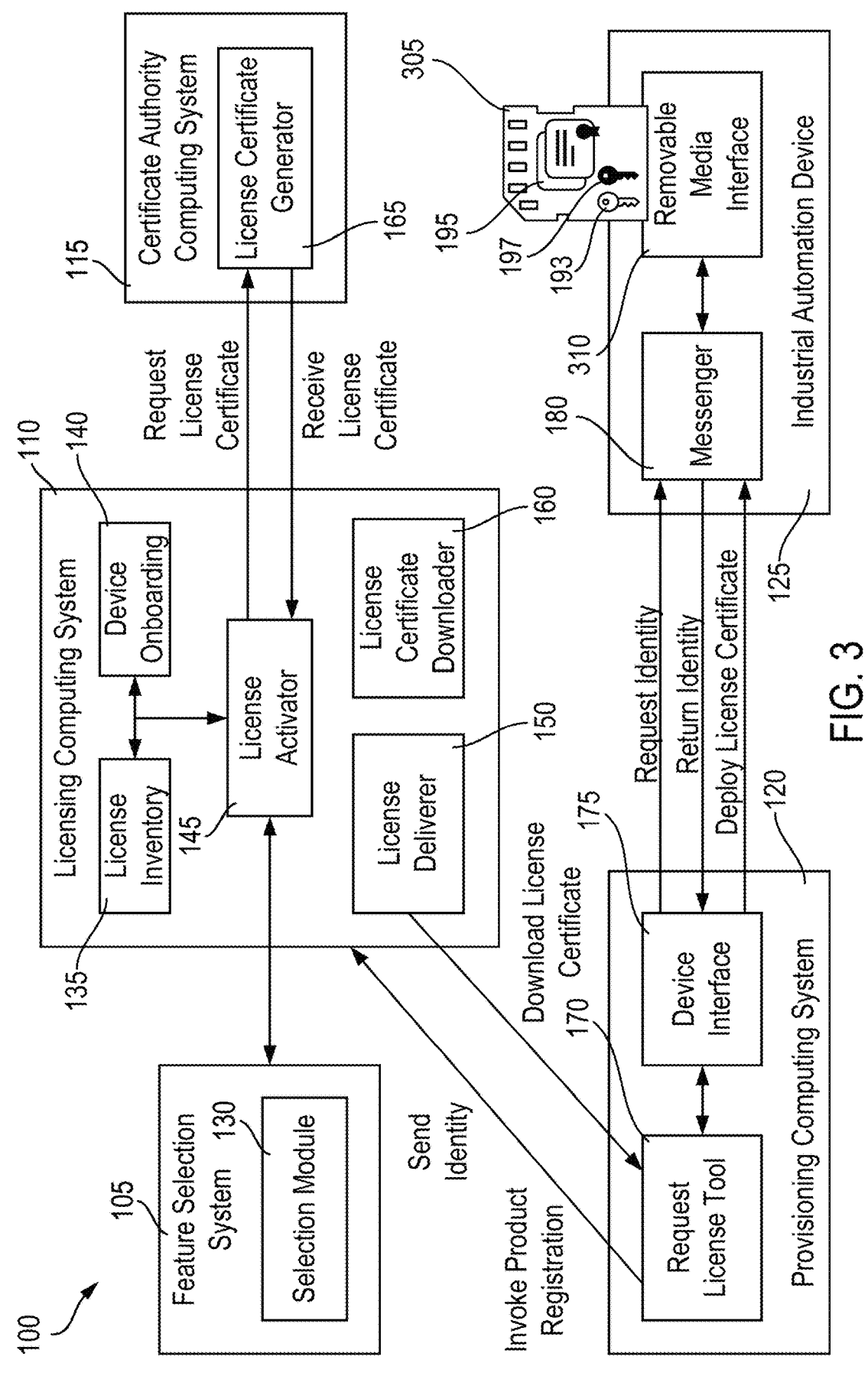
FIG. 3 depicts a system to generate a license certificate bound to a removable media device of an industrial automation system based on an identity of a removable memory device installed with a host device, according to an exemplary embodiment.

Referring now to FIG. 3, among others, an example system 100 to generate a license certificate 195 bound to a device 125 of an industrial automation system based on a device identify of a removable memory device 305 installed with the device 125 is shown. The system 300 can be based on a public key associated with a private key 197 that the removable media device 305 possesses. The device 125 can include a removable media interface 310. The interface 310 can be a universal serial bus (USB) interface, a secure digital (SD) card interface, a hard drive interface, etc. The removable memory device 305 can be a USB flash drive, a USB dongle, a SD card, an external hard disk drive (HDD), an external solid-state drive (SSD), or any other peripheral device, etc. The removable memory device 305 can be a secure removable medium. The removable memory device 305 can be a transportable device that can be installed or connected with the removable media interface 310 to electrically communicate with the device 125. Furthermore, the removable memory device 305 can be uninstalled, detached, disconnected, or removed from the removable media interface 310. The removable memory device 305 can provide a device identity and/or public key that the license activator 145 can bind the license certificate 195 to. The license activator 145 can lookup the public key using the device identity. The removable memory device 305 can provide the public key associated with a private key anchored in a cryptographic root of trust.

The removable memory device 305 can be programmed, provisioned, or manufactured by a manufacturer that controls or is associated with the certificate authority computing system 115 or the licensing computing system 110. The manufacturer can be the same manufacturer as the industrial automation system, and/or the device 125. The manufacturer can program the removable memory device 305 to include or store the public key 193, a private key 197, and/or license certificates 195. In some embodiments, the removable memory device 305 can be programmed with license certificates 195, and once installed with the device 125, can provide the device 125 access to features identified by the license certificates 195. In some embodiments, the removable memory device can be loaded with a vendor certificate.

In some embodiments, the device interface 175 can transmit a request for a device identify of the memory device 305. In some embodiments, the device interface 175 can transmit a request for the removable memory device to generate a CSR or request a copy of a vendor certificate. The device identity can be a message, data packet, data package, or piece of information including the public key 193. The device identity can be or include the public key 193. The device interface 175 can transmit the request to the device 125 responsive to receiving a request to generate a new license certificate 195 for the device 125, or responsive to the messenger 180 sending a message to the system 120 notifying the system 120 that the removable memory device 305 is installed with the device 125.

Responsive to transmitting the request to the device 125, the device 125 can transmit the card identity to the system 120. The system 120 can receive the card identity returned from the device 125. The provisioning computing system 120 can send the received identity to the licensing computing system 110 to cause the license activator 145 to generate a certificate 195 using the card identity. The license activator 145 can extract the public key 193 from the identity of the removable memory device 305. The license activator 145 can transmit a request to the certificate authority computing system 115 including the public key 193. The license certificate generator 165 can generate the license certificate 195 to include the public key 193, and return the license certificate 195 to the license activator 154. The generated license certificate 195 can be downloaded to the system 120, and then transmitted to the device 125. Responsive to receiving the license certificate 195, the device 125 can load or install the license certificate 195 onto the removable memory device 305.

Figure 4:
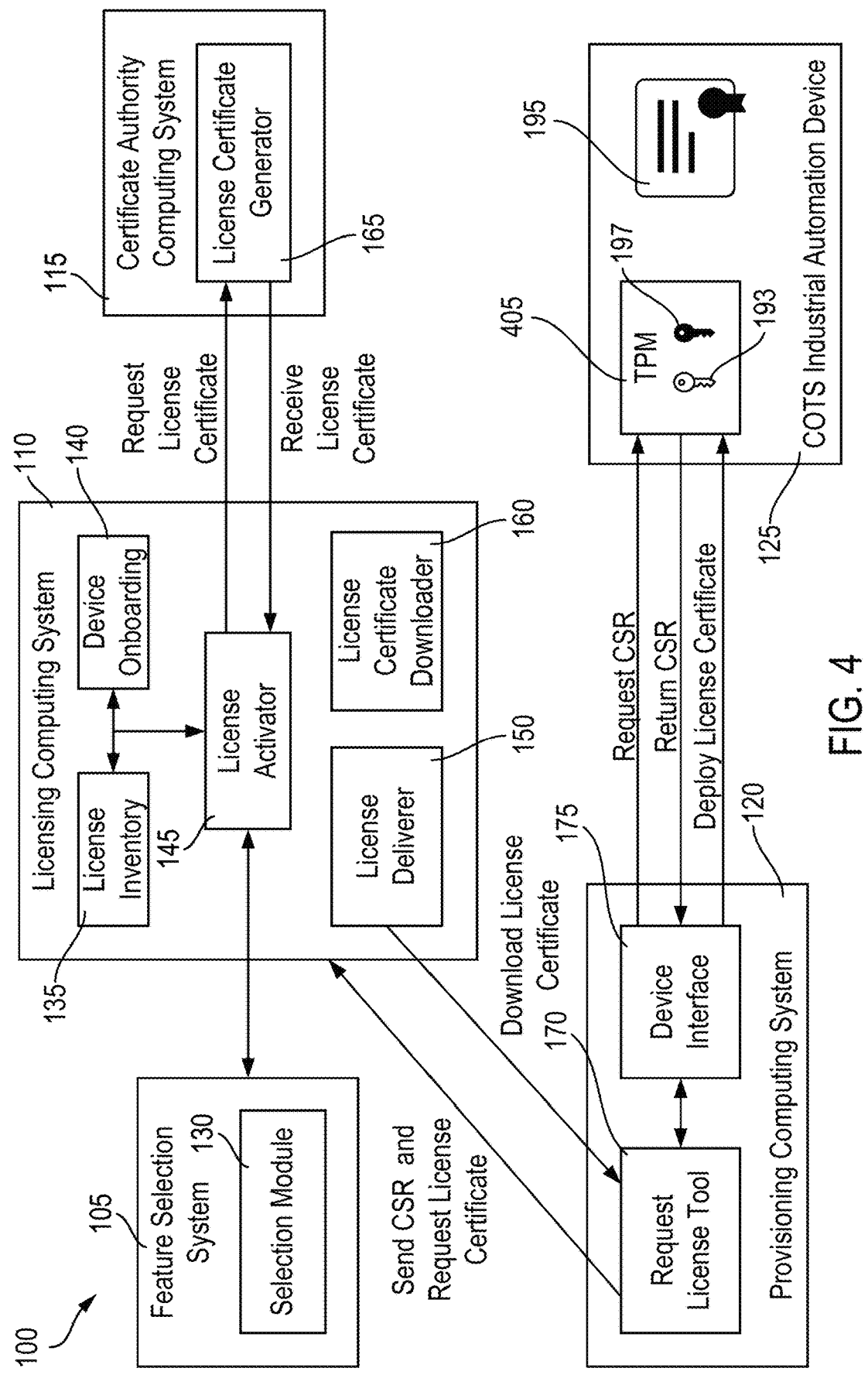
FIG. 4 depicts a system to generate a license certificate bound to a commercial off the shelf (COTS) device of an industrial automation system based on a certificate signing request (CSR) generated by a trusted platform module (TPM) of the COTS device, according to an exemplary embodiment.

Referring now to FIG. 4, among others, an example system 100 to generate a license certificate 195 bound to a COTS device 125 of an industrial automation system based on a CSR generated by the COTS device 125 is shown. The device 125 can be a COTS device 125 that is manufactured and sold by a manufacturer other than the manufacturer of the industrial automation system and/or a manufacturer that controls or operates the certificate authority computing system 115 or the licensing computing system 110.

The device 125 can include a TPM 405. The TPM 405 can provide a device identity that the license activator 145 can bind the license certificate 195 to. By using the TPM 405 as a cryptographic root of trust, the licensing provided by the system 100 can be extended to COTS devices 125, and not only devices that have been manufactured by a manufacturer associated with or in control of the certificate authority computing system 115 or the licensing computing system 110. The TPM 405 can be a hardware component of the device 125. The TPM 405 can be a security system or secured integrated circuit that includes cryptographic memory, a cryptographic processor to perform cryptographic processing, and a secured interface. The TPM 405 can be a software component, such as a firmware TPM. The TPM 405 can generate the private key 197 and/or the public key 193.

The TPM 405 can be configured to generate a CSR. The CSR can be a message, data packet, or a data element that provides information for a certificate authority to generate a certificate for. The CSR can include information about the device 125, e.g., a common name, an organization name, an organizational unit, a city/locality, etc. The CSR can further include the public key 193 for which to create the certificate with. The CSR can include data describing the type and length of the private key 197, e.g., indicate that the public key 193 is an RSA 2048 key, an RSA 4096 key, or an ECC key.

The system 120 can transmit a request or prompt to the device 125 to cause the TPM 405 to generate a CSR. Responsive to the prompt, the TPM 405 can create the CSR, including the public key 193 or any other information necessary for applying for a certificate. Responsive to building or retrieving the CSR, the TPM 405 can return or transmit the CSR or the system 120. The system 120 can receive the CSR responsive to the prompt. The system 120 can forward the CSR to the licensing computing system 110. The system 120 can send the CSR along with a request to generate a license certificate for a particular feature. This can be part of the prompting that the provisioning computing system 120 prompts the device 125 to cause the TPM 405 to generate the CSR. The CSR can be signed by the TPM 405, so the CSR cannot be modified after construction. The license information can be part of the original construction. The license activator 145 can receive the CSR, and extract the public key 193 from the CSR. With the extracted public key 193 and an indication of the feature to license to the device 125, the license activator 145 can cause the license certificate generator 165 to generate a license certificate 195. Responsive to generating the license certificate 195, the system 110 can transmit the license certificate 195 to the system 120, which can in turn deploy the license certificate 195 to the device 125.

Figure 5:
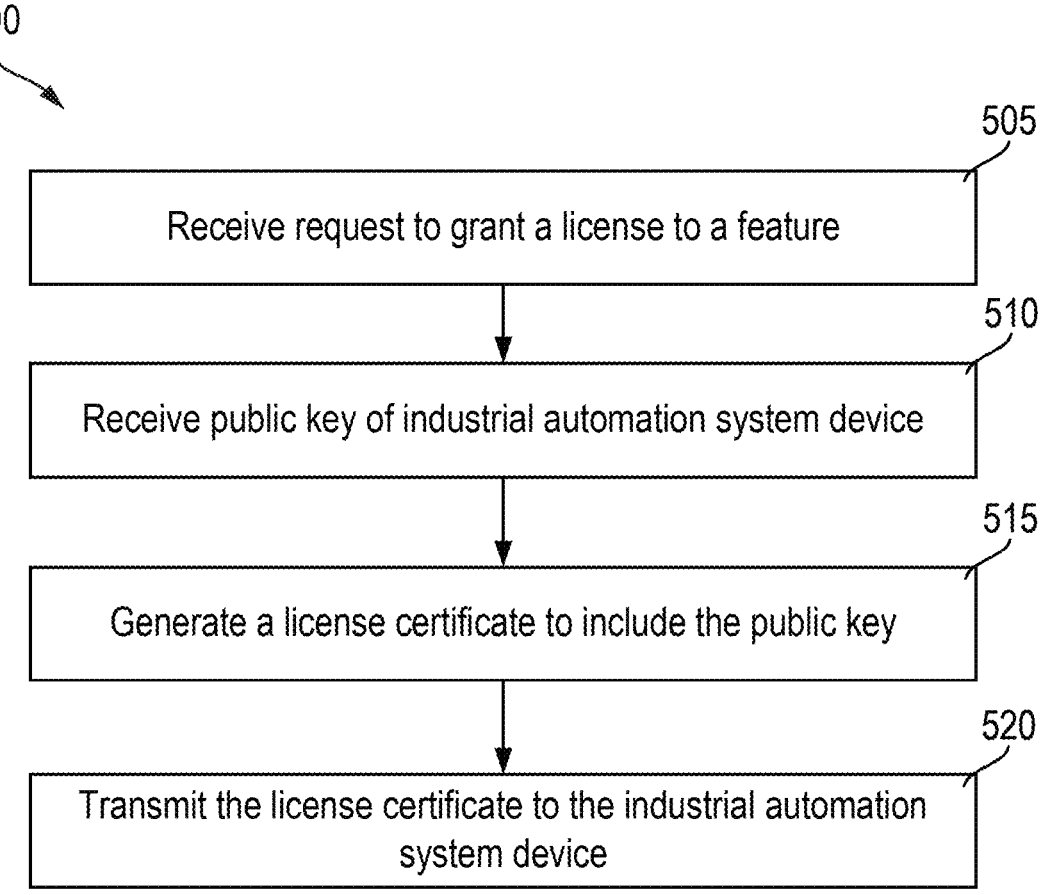
FIG. 5 depicts a method of generating a license certificate bound to a device of an industrial automation system, according to an exemplary embodiment.

Referring now to FIG. 5, among others, an example method 500 of generating a license certificate 195 bound to a device 125 of an industrial automation system is shown. The method 500 can be performed by at least one computing system, which can be or include the system 100. The computing system can be or include one or a combination of the certificate authority computing system 115, the licensing computing system 110, the feature selection system 105, the provisioning computing system 120, or the device 125. The method 500 can include an ACT 505 of receiving a request to grant a license to a feature. The method 500 can include an ACT 510 of receiving a public key of an industrial automation system device. The method 500 can include an ACT 515 of generating a certificate to include the public key. The method 500 can include an ACT 520 of transmitting the license certificate to the industrial automation system device.

At ACT 505, the method 500 can including receiving a request to grant a license to a feature. The method 500 can include receiving, by the feature selection system 105, a selection of a feature, a renewal of a feature, or a request to upgrade a feature to another feature. The requested feature to be licensed can be a feature of a software application or software service that runs on the device 125. In this regard, the request can be a request to enable the device 125 to utilize or execute the feature. The feature can be a feature of a software application or software service run on one or more computing systems, server systems, or cloud systems remote or external to the device 125. In this regard, the feature can be a feature that the device 125 invokes or accesses via the external computing system.

At ACT 510, the method 500 can include receiving a public key 193 of an industrial automation system device 125. The method 500 can include receiving, by the licensing computing system 110, the public key 193 of the device 125. The licensing computing system 110 can receive the public key 193 from a vendor certificate database 205. For example, for a device 125 manufactured by the same entity that manages and stores vendor certificates 190 in the vendor certificate database 205, the licensing computing system 110 can query or retrieve the public key 193 from the vendor certificate database 205 by retrieving a vendor certificate 190 based on an identifier of the device 125, and extracting the public key 193 from the vendor certificate 190.

The method 500 can include interrogating the device 125 to receive the public key 193. For example, the method 500 can include sending, by the provisioning computing system 120, a request for the vendor certificate 190 to the device 125, and the device 125 can respond by returning the vendor certificate 190 stored on the device 125. The method 500 can include providing the vendor certificate 190 to the licensing computing system 110. The method 500 can include extracting, by the licensing computing system 110, the public key 193 for the device 125 from the vendor certificate 190. In some embodiments, the method 500 can include interrogating a device 125 for a card or memory device identity (e.g., a public key 193 of the memory device) of a removable memory card 305 installed with the industrial automation device 125. In some embodiments, if the removable memory device 305 is PKCS11 compliant, the removable memory device 305 can generate a CSR itself.

The method 500 can further include causing a TPM 405 of a COTS industrial automation device 125 to generate a CSR from which the public key 193 can be extracted. The method 500 can include sending a prompt or request for a CSR to the device 125 including the TPM 405. The method 500 can include generating or retrieving the CSR from the TPM 405, and responding and returning the CSR to the provisioning computing system 120. The method 500 can include providing, by the provisioning computing system 120, the CSR to the licensing computing system 110. The method 500 can include extracting the public key 193 from the CSR for use in generate a license certificate 195.

At ACT 515, the method 500 can include generating a license certificate to include the public key 193. The method 500 can include calling, requesting, or causing, by the licensing computing system 110, the certificate authority computing system 115. The method 500 can include requesting, by the license activator 145, the certificate authority computing system 115 generate the license certificate 195 to include the public key 193 and an indication or identifier of a feature for the device 125 to enable or access. The method 500 can include generating, by the certificate authority computing system 115, the license certificate 195 to include the public key 193 and an indication of the feature. The license certificate 195 can be in an unencrypted, clear text, or in the clear format. More particularly, the public key 193 and the indication of the feature can be included in the license certificate 195 in an unencrypted format. Furthermore, the license certificate 195 can be generated to include an indication of an expiration time or an event triggering the end of access to the feature. The expiration time or the indication of the event can be included in the license certificate 195 in an unencrypted format.

The method 500 can include signing, by the certificate authority computing system 115, the license certificate 195 with a private key of the certificate authority computing system 115, which can be linked to or correspond to the private key 197. The certificate authority computing system 115 can cause the certificate chain to include the public key 193.

At ACT 520, the method 500 can include transmitting the license certificate 195 to the industrial automation system device 125. The method 500 can include transmitting, by the certificate authority computing system 115, the license certificate 195 to the licensing computing system 110. The method 500 can include transmitting, by the licensing computing system 110, the license certificate 195 to the provisioning computing system 120. The method 500 can include transmitting, by the provisioning computing system 120, the license certificate 195 to the industrial automation device 125.

The method 500 can include providing or verifying the authenticity of the license certificate 195. First, the device 125 can verify the authenticity of the license certificate 195 using the public key of the certificate authority. For example, the device 125 can prove that the signature of the license certificate 195 was signed by the private key of the certificate authority according to the certificate chain. The device 125 can validate the full certificate chain according to the CA's root certificate which the device 125 can have already imported into its trust store (such as at the time of manufacturing). Furthermore, the method 500 can include proving possession of the private key 197 that corresponds to the public key 193 included in the license certificate 195. For example, the license certificate 195 can be signed using the private key of the certificate authority computing system 115, and the device 125 can verify the signature using the public key of the certificate authority computing system 115. The device 125 (or another system) can generate pseudo-random data, and sign or encrypt the data using the public key 193. The device 125 can sign data (e.g., a nonce) using the private key 197, and another party or computing system can verify the signature using the public key 193 of the device 125 stored in the certificate 195. This can prove the device 125 is in possession of the private key 197.

In some embodiments, the feature can be performed by a computing system external to the device 125 (e.g., a server, a computer system, a cloud computing system, etc.). The device 125 can transmit a request to the external computing system to execute the feature. The request can include the vendor certificate 195. The external computing system can verify the authenticity of the license certificate 195, or verify that the public key 193 was intended to be included in the license certificate 195, and not injected by another system, using the public key of the license certificate 195. For example, because the license certificate 195 is signed by the private key of the certificate authority, and the license certificate 195 includes the public key 193, when the certificate authority signs the license certificate 195, the public key 193 can also be signed. Therefore, if the signature of the certificate authority can be verified using the public key of the certificate authority, the public key 193 can be verified as the key intended to be included in the license certificate 195 by the certificate authority, and not a key injected by a malicious system.

The external computing system can generate data, such as pseudo-random data, and encrypt the data using the public key 193 included in the vendor certificate 195. The external computing system can transmit, send, communicate, or provide the encrypted data to the device 125. The device 125 can use the private key 197 stored by the device 125 to decrypt the data, thereby proving that the device 125 has possession of the private key 197. The device 125 can optionally sign the decrypted data using the private key 197 and return the signed decrypted data to the external computing system. The signed decrypted data can prove to the external computing system that the device 125 is in possession of the private key 197 connected to the public key 193 that the external computing system retrieved from the license certificate 195 and used to encrypt the data. In some embodiments, instead of encrypting the data using the public key 193, the external computing system can use another means to encrypt the data, such as a session key. Responsive to the device 125 proving that the device 125 is in possession of the private key 197, the external computing system can execute the feature licensed by the license certificate 195.

Figure 6:
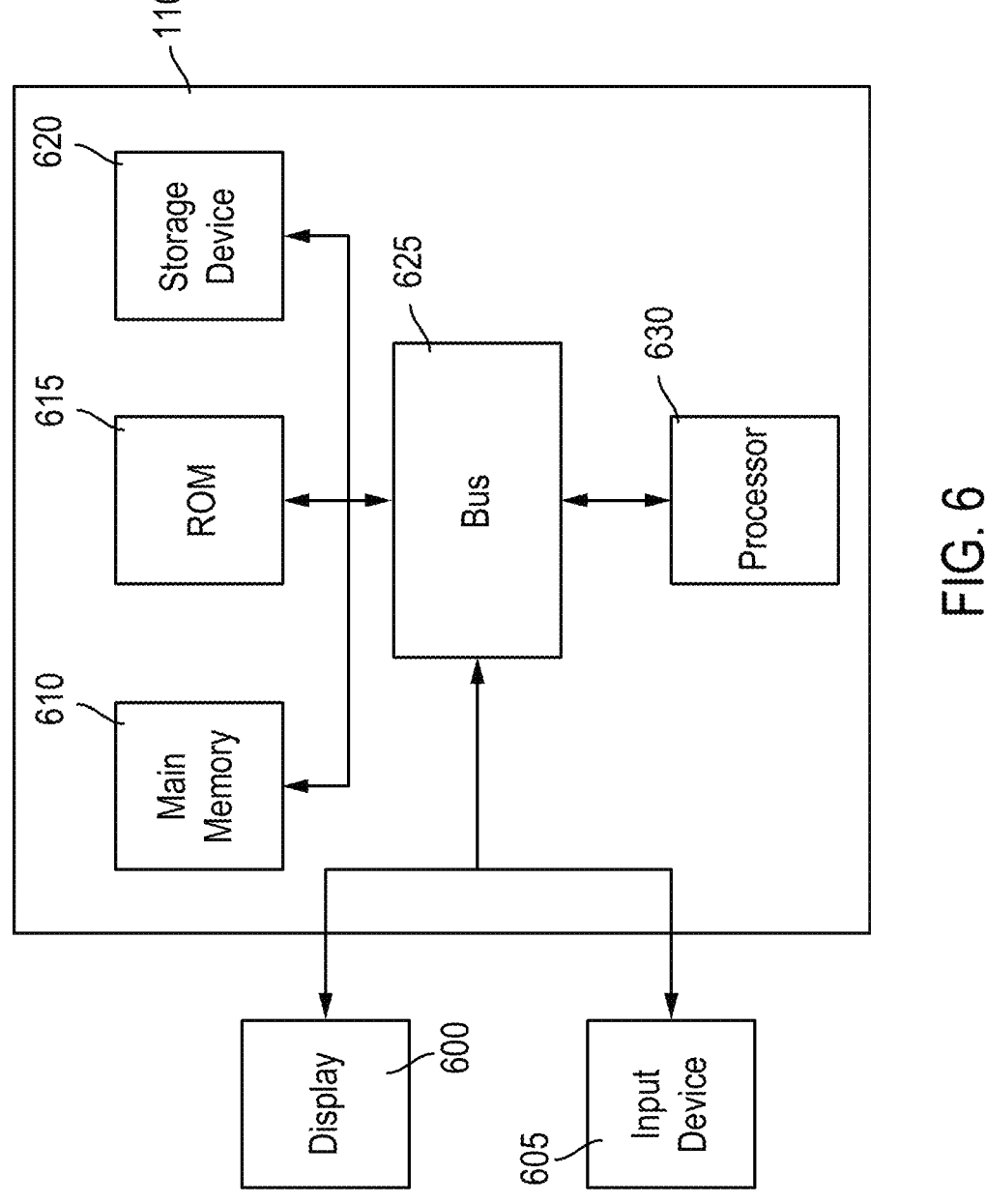
FIG. 6 depicts a computing architecture of a computing system which can be used by the systems and methods of FIGS. 1-5, according to an exemplary embodiment.

Referring now to FIG. 6, among others, an example block diagram of a computing system 110 is shown. The computing system 110 can include or be used to implement a data processing system or its components. The architecture described in FIG. 6 can be used to implement the industrial automation device 125, the certificate authority computing system 115, the licensing computing system 110, the feature selection system 105, or the provisioning computing system 120. The computing system 110 can include at least one bus 625 or other communication component for communicating information and at least one processor 630 or processing circuit coupled to the bus 625 for processing information. The computing system 110 can include one or more processors 630 or processing circuits coupled to the bus 625 for processing information. The computing system 110 can include at least one main memory 610, such as a random access memory (RAM) or other dynamic storage device, coupled to the bus 625 for storing information, and instructions to be executed by the processor 630. The main memory 610 can be used for storing information during execution of instructions by the processor 630. The computing system 110 can further include at least one read only memory (ROM) 615 or other static storage device coupled to the bus 625 for storing static information and instructions for the processor 630. A storage device 620, such as a solid state device, magnetic disk or optical disk, can be coupled to the bus 625 to persistently store information and instructions.

The computing system 110 can be coupled via the bus 625 to a display 600, such as a liquid crystal display, or active matrix display. The display 600 can display information to a user. An input device 605, such as a keyboard or voice interface can be coupled to the bus 625 for communicating information and commands to the processor 630. The input device 605 can include a touch screen of the display 600. The input device 605 can include a cursor control, such as a mouse, a trackball, or cursor direction keys, for communicating direction information and command selections to the processor 630 and for controlling cursor movement on the display 600. The display 600 and the input device 605 can be a component of the client device 125 coupled with the computing system 110.

The processes, systems and methods described herein can be implemented by the computing system 110 in response to the processor 630 executing an arrangement of instructions contained in main memory 610. Such instructions can be read into main memory 610 from another computer-readable medium, such as the storage device 620. Execution of the arrangement of instructions contained in main memory 610 causes the computing system 110 to perform the illustrative processes described herein. One or more processors in a multi-processing arrangement can be employed to execute the instructions contained in main memory 610. Hard-wired circuitry can be used in place of or in combination with software instructions together with the systems and methods described herein. Systems and methods described herein are not limited to any specific combination of hardware circuitry and software.

Although an example computing system has been described in FIG. 6, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiations in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, Python, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices including cloud storage). The operations described in this specification can be implemented as operations performed by a data processing apparatus on data stored on one or more computer-readable storage devices or received from other sources.

The terms "computing device," "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. ACTs, elements and features discussed in connection with one implementation are not intended to be excluded from a similar role in other implementations.

The phraseology and terminology used herein is for the purpose of description and should not be regarded as limiting. The use of "including" "comprising" "having" "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any ACT or element being based on any information, act or element may include implementations where the act or element is based at least in part on any information, act, or element.

Any implementation disclosed herein may be combined with any other implementation or example, and references to "an implementation," "some implementations," "one implementation" or the like are not necessarily mutually exclusive and are intended to indicate that a particular feature, structure, or characteristic described in connection with the implementation may be included in at least one implementation or example. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A,' only 'B,' as well as both 'A' and 'B.' Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

What is claimed is:

1. A system for licensing features to industrial devices employed in an industrial automation system, the system comprising:

one or more memory devices storing instructions thereon that, when executed by one or more processors, cause the one or more processors to:

receive a public key of a device of the industrial devices employed in the industrial automation system, the public key corresponding to a private key possessed by the device;

receive a request to grant the device a license, responsive to receiving the public key of the device, to enable a licensable feature of the device or access a licensable feature of the industrial automation system;

generate a certificate comprising the received public key of the device and an indication of the granted license in a non-encrypted format; and transmit the generated certificate, including the indication of the granted license in the non-encrypted format, to the device to cause the device to effectively enable the feature of the device or access the feature of the industrial automation system responsive to the device proving possession of the private key corresponding to the public key in the certificate without requiring the certificate including the indication of the granted license to be encrypted and only readable by a recipient device possessing a corresponding decryption key.

2. The system of claim 1, wherein the instructions cause the one or more processors to:

generate a signature for the certificate by signing the certificate using a private key of the certificate authority corresponding to a public key of the certificate authority stored in a root certificate of the certificate authority; and the system further comprising the device, the device comprising one or more processing circuits to validate the signature of the certificate using the public key of the certificate authority stored in the root certificate of the certificate authority.

3. The system of claim 1, wherein the instructions cause the one or more processors to:

generate a plurality of certificates comprising the public key, indications of different features of the device or access to different features of the industrial automation system, and different expiration times; and transmit the plurality of certificates to the device to cause the device to enable the different features of the device or access the different features of the industrial automation system responsive to the device proving possession of the private key corresponding to the public key in the plurality of certificates.

4. The system of claim 1, wherein the instructions cause the one or more processors to:

transmit a request to the device for a vendor certificate installed on the device during device manufacturing, the vendor certificate including the public key;

receive the vendor certificate from the device responsive to the request; and extract the public key of the device from the vendor certificate.

5. The system of claim 1, wherein:

the device is manufactured by a first manufacturer different than a second manufacturer of the industrial automation system; and the instructions cause the one or more processors to:

transmit a prompt to the device to cause a trusted platform module of the device to generate a message applying for a certificate from a certificate authority, the message comprising the public key of the device;

receive, responsive to the prompt, the message applying for the certificate from the certificate authority; and extract the public key from the message.

6. The system of claim 1, wherein the instructions cause the one or more processors to:

transmit, to the device, a request for an identity of a removable memory device installed at the device, the removable memory device storing the identity, wherein the private key possessed by the device is stored on the device or the removable memory device;

receive, responsive to the request, the identity from the device; and cause the certificate to be generated using the identity.

7. The system of claim 1, further comprising the device, the device comprising one or more processing circuits to:

receive the certificate from the one or more processors;

transmit a request to one or more computing systems of the industrial automation system located remote from the device to execute the feature of the industrial automation system;

receive, from the one or more computing systems, a request to prove possession of the private key corresponding to the public key in the certificate; and return a response to the one or more computing systems proving possession of the private key and causing the one or more computing systems to execute the feature of the industrial automation system.

8. The system of claim 1, wherein the instructions cause the one or more processors to:

receive a length of time for the license to remain valid; and generate the certificate using the length of time to include an expiration time for the license to expire;

the system further comprising the device comprising one or more processing circuits to:

read the expiration time from the certificate; and disable the feature of the device or access to the feature of the industrial automation system responsive to a determination that a current time has reached the expiration time.

9. The system of claim 1, wherein the instructions cause the one or more processors to:

receive a length of time for the license to remain valid; and generate the certificate using the length of time to include an expiration time for the license to expire;

the system further comprising one or more computing systems to:

read the expiration time from the certificate;

receive a request from the device to perform the feature of the industrial automation system; and decline the request from the device to perform the feature responsive to a determination that a current time has reached the expiration time.

10. The system of claim 1, where the instructions cause the one or more processors to:

receive a request to cancel access to the feature of the device or the feature of the industrial automation system; and revoke the certificate responsive to reception of the request.

11. The system of claim 1, wherein the instructions cause the one or more processors to:

receive an identifier of the device;

lookup, using the identifier of the device, the public key from a database storing a plurality of identifiers of devices manufactured by a manufacturer of the industrial automation system and public keys corresponding to private keys stored on the devices; and cause the certificate to be generated using the public key looked up from the database.

12. The system of claim 1, wherein the instructions cause the one or more processors to:

receive an indication of an event to trigger an end of the license; and cause the certificate to be generated to include the indication of the event; and the system further comprising the device comprising one or more processing circuits configured to:

monitor a plurality of operations performed by the one or more processing circuits or one or more computing systems of the industrial automation system remote from the device;

determine, based on the indication of the event of the certificate and the plurality of operations, that the event is triggered; and request that a certificate authority revoke the certificate responsive to the determination that the event is triggered.

13. The system of claim 12, wherein the event is a predefined number of components being manufactured by the industrial automation system.

14. The system of claim 12, wherein the event is a predefined number of optimizations run by the one or more computing systems to optimize operation of the industrial automation system.

15. A method of licensing features to industrial devices employed in an industrial automation system, the method comprising:

receiving, by one or more processing circuits, a public key of the industrial devices employed in a device of the industrial automation system, the public key corresponding to a private key possessed by the device;

receiving, by the one or more processing circuits, a request to grant the device a license, responsive to receiving the public key of the device, to enable a licensable feature of the device or access a licensable feature of the industrial automation system;

generating, by the one or more processing circuits, a certificate comprising the received public key of the device and an indication of the granted license in a non-encrypted format; and transmitting, by the one or more processing circuits, the generated certificate, including the indication of the granted license in the non-encrypted format, to the device to cause the device to effectively enable the feature of the device or access the feature of the industrial automation system responsive to the device proving possession of the private key corresponding to the public key in the certificate without requiring the certificate including the indication of the granted license to be encrypted and only readable by a recipient device possessing a corresponding decryption key.

16. The method of claim 15, further comprising:

receiving, by the one or more processing circuits, an identifier of the device;

retrieving, by the one or more processing circuits, using the identifier of the device, the public key from a database storing a plurality of identifiers of devices manufactured by a manufacturer of the industrial automation system and public keys corresponding to private keys stored on the devices; and causing, by the one or more processing circuits, the certificate to be generated using the public key looked up from the database.

17. The method of claim 15, further comprising:

receiving, by the one or more processing circuits, an indication of an event to trigger an end of the license;

generating, by the one or more processing circuits, the certificate to include the indication of the event;

monitoring, by the device, a plurality of operations performed by the one or more processing circuits or one or more computing systems of the industrial automation system remote from the device;

determining, by the device, based on the indication of the event of the certificate and the plurality of operations, that the event is triggered; and requesting, by the device, that a certificate authority revoke the certificate responsive to the determination that the event is triggered.

18. The method of claim 15, further comprising:

sending, by a remote system, a request to the one or more processing circuits to verify that the certificate license has not been revoked; and verifying, by the remote system, that the certificate was issued by a certificate authority.

19. An industrial device of an industrial automation system, the industrial device comprising:

one or more processing circuits to:

transmit a public key of the industrial device employed in the industrial automation system to one or more computing systems, the public key corresponding to a private key possessed by the industrial device;

responsive to transmitting the public key to the one or more computing systems, transmitting a request to grant the industrial device a license to enable a licensable feature of the industrial device or access a licensable feature of the industrial automation system;

receive, from the one or more computing systems, a certificate comprising the transmitted public key of the industrial device and an indication of a license in a non-encrypted format, the license to enable the licensable feature of the industrial device or access the licensable feature of the industrial automation system;

prove possession of the private key corresponding to the transmitted public key in the certificate including the indication of the granted license in the non-encrypted format; and perform the licensable feature or access the licensable feature of the industrial automation system responsive to proving possession of the private key without requiring the certificate including the indication of the granted license to be encrypted and only readable by a recipient device possessing a corresponding decryption key.

20. The industrial device of claim 19, wherein the one or more processing circuits are configured to:

transmit a request to one or more external computing systems of the industrial automation system located remote from the industrial device to execute the feature of the industrial automation system;

receive, from the one or more external computing systems, a request to prove possession of the private key corresponding to the public key in the certificate; and return a response to the one or more external computing systems proving possession of the private key and causing the one or more external computing systems to execute the feature of the industrial automation system.

* * * * *